US006824586B2

(12) United States Patent
Omori et al.

(10) Patent No.: US 6,824,586 B2
(45) Date of Patent: Nov. 30, 2004

(54) POWDER FOR CAPACITOR, SINTERED BODY THEREOF AND CAPACITOR USING THE SINTERED BODY

(75) Inventors: Kazuhiro Omori, Kanagawa (JP); Kazumi Naito, Chiba (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 10/433,047

(22) PCT Filed: Nov. 30, 2001

(86) PCT No.: PCT/JP01/10484

§ 371 (c)(1),
(2), (4) Date: May 30, 2003

(87) PCT Pub. No.: WO02/45106

PCT Pub. Date: Jun. 6, 2002

(65) Prior Publication Data

US 2004/0022008 A1 Feb. 5, 2004

Related U.S. Application Data

(60) Provisional application No. 60/267,411, filed on Feb. 9, 2001.

(30) Foreign Application Priority Data

Nov. 30, 2000 (JP) ........................................ 2000-366039

(51) Int. Cl.$^7$ ................................................. B22F 1/00
(52) U.S. Cl. ........................... 75/255; 75/245; 361/305
(58) Field of Search .................... 75/255, 245; 361/305

(56) References Cited

U.S. PATENT DOCUMENTS

| | | | |
|---|---|---|---|
| 3,321,677 A | | 5/1967 | Mandelcorn et al. |
| 3,849,124 A | | 11/1974 | Villani |
| 3,926,567 A | * | 12/1975 | Fletcher et al. ............. 428/403 |
| 4,084,965 A | | 4/1978 | Fry |
| 5,154,779 A | * | 10/1992 | Holcombe et al. .......... 148/207 |
| 6,115,235 A | | 9/2000 | Naito |
| 6,261,337 B1 | * | 7/2001 | Kumar ........................ 75/255 |
| 6,540,810 B2 | | 4/2003 | Naito et al. |
| 2004/0022008 A1 | | 2/2004 | Omori et al. |

FOREIGN PATENT DOCUMENTS

| | | |
|---|---|---|
| EP | 0 953 847 A | 11/1999 |
| JP | 55-157226 | 12/1980 |
| WO | WO 00 67936 A | 11/2000 |

\* cited by examiner

*Primary Examiner*—Ngoclan T. Mai
(74) *Attorney, Agent, or Firm*—Sughrue Mion, PLLC

(57) ABSTRACT

A powder for capacitors, which contains 0.01 to 15 atom % of zirconium and mainly comprises niobium and/or tantalum having an average particle size of from 0.2 to 5 μm; a sintered body thereof; an a capacitor fabricated from the sintered body as one part electrode, a dielectric material formed on the surface of the sintered body, and another part electrode provided on the dielectric material. A capacitor manufactured from the sintered body of a powder for capacitors of the present invention have a large capacitance per unit mass and good leakage current characteristics.

21 Claims, No Drawings

POWDER FOR CAPACITOR, SINTERED BODY THEREOF AND CAPACITOR USING THE SINTERED BODY

CROSS-REFERENCE TO RELATED APPLICATIONS

This application is based on the provisions of 35 U.S.C. Article 111(a) with claiming the benefit of filing dates of U.S. provisional application Ser. No. 60/267,411 filed on Feb. 9, 2001, under the provisions of 35 U.S.C. 111(b), pursuant to 35 U.S.C. Article 119(e) (1).

TECHNICAL FIELD

The present invention relates to an earth-acid metal (mainly, niobium or tantalum) powder from which a capacitor having a large capacitance per unit mass and good leakage current characteristics can be produced. More specifically, the present invention relates to a niobium powder, a tantalum powder and a niobium-tantalum alloy powder, each containing a specific amount of zirconium, and also relates to a sintered body using the powder and a capacitor using the sintered body.

BACKGROUND ART

Capacitors for use in electronic instruments such as potable telephone and personal computer are demanded to have a small size and a large capacitance. Among these capacitors, a tantalum capacitor is preferred because of its large capacitance for the size and good performance. In the tantalum capacitor, a sintered body of tantalum powder is generally used for the anode moiety. In order to increase the capacitance of these tantalum capacitors, it is necessary to increase the mass of the sintered body or to use a sintered body increased in the surface area by pulverizing the tantalum powder.

The method of increasing the mass of the sintered body necessarily involves enlargement of the capacitor shape and cannot satisfy the requirement for downsizing. On the other hand, in the method of pulverizing tantalum powder to increase the specific surface area, the pore size of the tantalum sintered body decreases or closed pores increase at the stage of sintering and therefore, impregnation of the cathode agent in the later process becomes difficult. In order to solve these problems, a method of decreasing closed pores at the stage of sintering and a method of manufacturing a capacitor using a material having a dielectric constant larger than that of tantalum are being studied. The material having a larger dielectric constant includes niobium.

JP-A-55-157226 (the term "JP-A" as used herein means an "unexamined published Japanese patent application") discloses a method for producing a sintered element for capacitors, where an agglomerated powder of niobium fine powder particles (primary powder) having a particle size of 2.0 $\mu$m or less is molded under pressure, a sintered body of the molded article is cut into fine pieces, a lead part is joined therewith and then these are again sintered. However, this patent publication does not disclose in detail the properties of the capacitor manufactured using the sintered element.

U.S. Pat. No. 4,084,965 discloses a capacitor using a niobium powder of 5.1 $\mu$m obtained by hydrogenating and pulverizing a niobium ingot. However, the niobium sintered body has a large leakage current value (hereinafter simply referred to as "LC value") and the practicability thereof is low.

JP-A-10-242004 (U.S. Pat. No. 6,115,235) discloses a technique of improving the LC value, for example, by partially nitriding a niobium powder. However, in the case of manufacturing a high-capacitance capacitor from a niobium sintered body using a niobium powder having a fine particle size, a capacitor having a peculiarly large LC value is produced in some cases.

Accordingly, the object of the present invention is to provide a powder for capacitors, which can provide a capacitor having a large capacitance per unit mass and a small leakage current value. The object of the present invention includes providing a sintered body using the powder and a capacitor using the sintered body.

DISCLOSURE OF INVENTION

As a result of extensive investigations to solve the above-described problems, the present inventors have found that by incorporating a specific amount of zirconium into niobium, tantalum or a niobium-tantalum alloy, a large specific surface area can be maintained even if the powder used for sintering has a fine average particle size and that when a capacitor is manufactured using this sintered body, a high-capacitance and stable capacitor having a low LC value can be obtained. The present invention has been accomplished based on these findings.

More specifically, the present invention relates to the following powder for capacitors, a sintered body thereof, and a capacitor using the sintered body.

1. A powder for capacitors, which contains zirconium and mainly comprises niobium and/or tantalum.

2. The powder for capacitors as described in 1 above, which contains from 0.01 to 15 atom % of zirconium and mainly comprises niobium and/or tantalum.

3. The powder for capacitors as described in 1 or 2 above, which mainly comprises niobium.

4. The powder for capacitors as described in 1 or 2 above, which mainly comprises tantalum.

5. The powder for capacitors as described in 1 above, which mainly comprises a niobium-tantalum alloy.

6. The powder for capacitors as described in any one of 1 to 5 above, wherein the average particle size is from 0.2 to 5 $\mu$m.

7. The powder for capacitors as described in any one of 1 to 5 above, wherein the specific surface area is from 0.5 to 15 $m^2/g$.

8. The powder for capacitors as described in any one of 1 to 5 above, wherein a part of niobium and/or tantalum is combined with at least one element selected from nitrogen, carbon, boron or sulfur.

9. The powder for capacitors as described in 8 above, wherein the amount of the combined element above is 50~200,000 ppm.

10. A powder for capacitors, having an average particle size of from 20 to 500 $\mu$m, which is obtained by granulating the powder for capacitors described in any one of 1 to 9 above.

11. A sintered body using the powder for capacitors described in any one of 1 to 10 above.

12. The sintered body as described in 11 above, wherein the specific surface area is from 0.5 to 5 m$^2$/g.

13. A capacitor fabricated from the sintered body described in 11 or 12 above as one part electrode, a dielectric material formed on the surface of the sintered body, and another part electrode provided on the dielectric material.

14. The capacitor as described in 13 above, wherein the dielectric material contains a niobium oxide and/or a tantalum oxide.

15. The capacitor as described in 14 above, wherein the niobium oxide and/or tantalum oxide is formed by electrolytic oxidation.

16. The capacitor as described in 13 above, wherein the another part electrode is at least one material selected from an electrolytic solution, an organic semiconductor or an inorganic semiconductor.

17. The capacitor as described in 16 above, wherein the another part electrode is formed of an organic semiconductor and the organic semiconductor is at least one organic semiconductor selected from the group consisting of an organic semiconductor comprising a benzopyrroline tetramer and chloranile, an organic semiconductor mainly comprising tetrathiotetracene, an organic semiconductor mainly comprising tetracyanoquinodimethane, and an organic semiconductor mainly comprising an electrically conducting polymer obtained by doping a dopant into a polymer comprising two or more repeating units represented by the following formula (1) or (2):

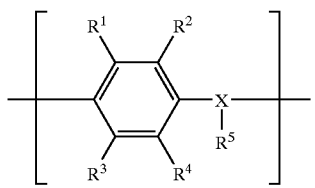
(1)

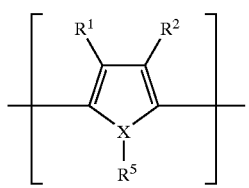
(2)

(wherein $R^1$ to $R^4$, which may be the same or different, each represents a hydrogen atom, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom and represents a hydrogen atom or an alkyl group having from 1 to 6 carbon atoms, and each of the pairs $R^1$ and $R^2$, and $R^3$ and $R^4$ may combine with each other to form a ring).

18. The capacitor as described in 17 above, wherein the organic semiconductor is at least one member selected from polypyrrole, polythiophene and substitution derivatives thereof.

DETAILED DESCRIPTION OF INVENTION

The present invention relates to a niobium powder, a tantalum powder and a niobium-tantalum alloy powder for capacitors, each comprising zirconium. These powder materials exhibit similar performance and accordingly, the present invention is described below using a niobium powder as an example.

The capacitance of a capacitor is generally represented by the following formula:

$$C = \epsilon \times (S/d)$$

(C: capacitance, $\epsilon$: dielectric constant, S: specific surface area, and d: distance between electrodes).

Here, d=k×V (k: constant, V: forming voltage), therefore, C=ϵ×(S/(k×V)) and then C×V=(ϵ/k)×S. Accordingly, the capacitance of a capacitor can be elevated by increasing the specific surface area (S).

The first means for increasing the specific surface area of a sintered body for use in capacitors is to reduce the particle size of the powder used in the capacitor. In the present invention, the average primary particle size of the zirconium-containing niobium powder used for manufacturing a sintered body is less than 5 μm, so that the specific surface area of the powder particle can be increased to the practical level.

The particle size and the specific surface area of the zirconium-containing niobium powder manufactured as one example by the present inventor (according to a pulverization method) are shown in Table 1 below.

TABLE 1

| Average Particle Size ($D_{50}$) | Specific Surface Area (S) |
| --- | --- |
| 5 μm | 0.5 m$^2$/g |
| 2 μm | 1.2 m$^2$/g |
| 0.9 μm | 2.1 m$^2$/g |
| 0.5 μm | 4.1 m$^2$/g |
| 0.2 μm | 9.8 m$^2$/g |

The average particle size ($D_{50}$) shown in Table 1 indicates a particle size value when the cumulative % by mass measured using a particle size distribution measuring apparatus ("Microtrack", trade name) is 50% by mass. The specific surface area is a value measured by the BET method.

As is apparent from Table 1, the specific surface area of the zirconium-containing niobium powder can be increased by reducing the average particle size thereof, however, if the average particle size of the zirconium-containing niobium powder is less than 0.2 μm, the pore size becomes small and closed pores increase when a sintered body is produced, as a result, impregnation of a cathode agent in the later step becomes difficult and the obtained capacitor cannot have a large capacitance and cannot be suited for the practical use. On the other hand, if the average particle size is 5 μm or more, a large capacitance cannot be obtained because of decrease in the specific surface area. Accordingly, in the present invention, the average particle size of the zirconium-containing niobium powder is preferably from 0.2 to less than 5 μm.

The second means for increasing the specific surface area of a sintered body for use in capacitors is to manufacture a sintered body by using powder particles having a small average particle size while inhibiting the production of closed pores at the sintering so as not to reduce the surface area. In general, the specific surface area can be maintained by lowering the sintering temperature, however, if the sintering temperature is lowered, the strength of the sintered body decreases to readily cause breakage.

In the present invention, a specific amount of zirconium is contained in the niobium powder, tantalum powder or niobium-tantalum alloy powder for use in the manufacture of a sintered body, so that a sintered body having a large specific surface area can be produced at a sintering temperature sufficiently high to obtain a necessary strength.

The specific surface area of a zirconium-containing niobium sintered body manufactured as one example by the present inventors and the specific surface area of a niobium sintered body not containing zirconium are shown in Table 2 below.

TABLE 2

| Sintering Temperature | Specific Surface Area (S) | |
|---|---|---|
| | Zirconium-Containing Niobium Sintered Body (Nb:Zr = 99.5:0.5 by mol) | Niobium Sintered Body |
| 1300° C. | 1.1 m²/g | 0.7 m²/g |
| 1250° C. | 1.4 m²/g | 0.9 m²/g |
| 1200° C. | 1.6 m²/g | 1.0 m²/g |
| 1150° C. | 1.8 m²/g | 1.2 m²/g |

As is apparent from Table 2, even when the sintering is performed at a temperature sufficiently high to obtain a practical strength, a specific surface area as large as about 1.5 times the specific surface area of niobium powder not containing zirconium can be maintained by containing zirconium.

Furthermore, even when a high-capacitance sintered body is manufactured using the zirconium-containing niobium powder reduced in the average particle size, a peculiar increase is not seen in the LC value. The reasons therefor are not clearly known but presumed as follows.

Niobium has a high bonding strength to an oxygen element and therefore, oxygen in the electrolytic oxide film is liable to diffuse toward the internal niobium metal side. However, in the sintered body of the present invention, the internal zirconium undertakes an interaction, such as bonding, with niobium and therefore, oxygen in the electrolytic oxide film is not easily bonded to the niobium metal inside the sintered body and is inhibited from diffusing toward the metal side, as a result, the stability of the electrolytic oxide film can be maintained and even in the case of a capacitor having a fine particle size and a high capacitance, an effect of lowering the LC and reducing the dispersion thereof can be attained.

In the present invention, the zirconium content in the niobium powder used for producing a sintered body is important. The zirconium content is preferably from 0.01 to 15 atom % and in view of the balance between the capacitance and the leakage current value of a capacitor manufactured, more preferably from 0.05 to 3 atom %.

If the zirconium content is too small, the above-described oxygen in the electrolytic oxide film cannot be inhibited from diffusing toward the internal niobium metal side, as a result, the stability of the electrolytic oxide film cannot be maintained and the effect of lowering the LC cannot be obtained. On the other hand, if the zirconium content is excessively large, the niobium content in the zirconium-containing niobium powder decreases and the capacitance lowers.

In the present invention, the zirconium-containing niobium powder for use in the manufacture of a sintered body preferably has an average particle size of 0.2 to 5 $\mu$m.

The zirconium-containing niobium powder having an average particle size within the above-described range can be obtained, for example, by a method of pulverizing and then dehydrogenating a hydride of niobium-zirconium alloy ingot, pellet or powder. The average particle size of the zirconium-containing niobium powder can be adjusted to a desired range by appropriately changing the amount of the niobium-zirconium alloy hydrogenated, the pulverization time, the grinding machine or the like.

It is also possible to mix the thus-obtained zirconium-containing niobium powder with another niobium powder not containing zirconium and having an average particle size of 0.2 $\mu$m to less than 5 $\mu$m, so as to adjust the zirconium content.

This another niobium powder can be obtained, for example, by a method of pulverizing and then dehydrogenating a hydride of niobium ingot, pellet or powder, a method of pulverizing a sodium reduction product of potassium fluoroniobate, or a method of reducing niobium oxide using an alkali metal, an alkaline earth metal, tantalum, niobium, aluminum, hydrogen, carbon or the like.

The zirconium-containing niobium powder of the present invention may be a mixture of a zirconium-free niobium powder and a metal zirconium or zirconium compound in the powder form. Examples of the zirconium compound which can be used include zirconium carbide, zirconium oxide (including stabilized zirconia), zirconium alkoxide, zirconium boride, zirconium nitride, zirconium sulfide, zirconium silicide, zirconium hydride, zirconium hydroxide, zirconium sulfate, zirconium silicate, zirconium halide, zirconium oxyhalide, zirconium oxyacetate and zirconium oxynitrate. These compounds can be used individually or in combination of two or more thereof.

The zirconium-containing niobium powder of the present invention can also be obtained by a method of reducing a mixture of niobium oxide and zirconium oxide using an alkali metal, an alkaline earth metal, tantalum, niobium, aluminum, hydrogen, carbon or the like.

In the zirconium-containing niobium powder of the present invention, a part of the zirconium-containing niobium powder may be bonded with at least one of nitrogen, carbon, boron and sulfur so as to more improve the leakage current value. The zirconium-containing niobium powder may contain any of zirconium-containing niobium nitride, zirconium-containing niobium carbide, zirconium-containing niobium boride and zirconium-containing niobium sulfide, which are nitrogen, carbon, boron or sulfur-bonded products, respectively. These bonded products may be contained individually or in combination of two, three or four thereof.

The bonded amount (the total content of nitrogen, carbon, boron and sulfur) varies depending on the shape of the zirconium-containing niobium powder, however, in the case of a powder having an average particle size of approximately from 0.2 to 5 μm, the total content is from 50 to 200,000 ppm, preferably from 200 to 20,000 ppm. If the total content is less than 50 ppm, the LC characteristics are not improved, whereas if it exceeds 200,000 ppm, the capacitance characteristics are worsened and not suitable as a capacitor.

The nitridation of the zirconium-containing niobium powder can be performed by liquid nitridation, ion nitridation, gas nitridation or a combination thereof. Among these, gas nitridation is preferred because the apparatus therefor is simple and the operation is easy.

The gas nitridation can be performed by allowing the above-described zirconium-containing niobium powder to stand in a nitrogen gas atmosphere. With a nitridation atmosphere temperature of 2,000° C. or less and a standing time of several hours, a zirconium-containing niobium powder having an objective nitrided amount can be obtained. The treatment time can be shortened by performing this treatment at a higher temperature.

The carbonization of the zirconium-containing niobium powder may be any one of gas-carbonization, solid-phase carbonization and liquid carbonization. The zirconium-containing niobium powder may be carbonized, for example, by allowing it to stand together with a carbon material or a carbon source such as an organic material having carbon (e.g., methane), at 2,000° C. or less under reduced pressure for several minutes to tens of hours.

The boronization of the zirconium-containing niobium powder may be either gas boronization or solid-phase boronization. The zirconium-containing niobium powder may be boronized, for example, by allowing it to stand together with boron pellets or a boron source such as boron halide (e.g., trifluoroboron), at 2,000° C. or less under reduced pressure for several minutes to tens of hours.

The sulfudization of the zirconium-containing niobium powder may be any one of gas sulfudization, ion sulfudization and solid-phase sulfudization. For example, the gas sulfudization in a sulfur gas atmosphere can be attained by allowing the zirconium-containing niobium powder to stand in a sulfur atmosphere. With a sulfudization atmosphere temperature of 2,000° C. or less and a standing time of less than tens of hours, a zirconium-containing niobium powder having an objective sulfudized amount can be obtained. The treatment time can be shortened by performing the treatment at a higher temperature.

The zirconium-containing niobium powder for capacitors, which is used in the manufacture of a sintered body, may be obtained by granulating the zirconium-containing niobium primary powder into an appropriate shape and further, after the above-described granulation, may be mixed with an appropriate amount of a non-granulated zirconium-containing niobium powder or niobium powder.

Examples of the granulation method include a method where a non-granulated zirconium-containing niobium powder is allowed to stand in a high vacuum, heated to an appropriate temperature and then cracked, and a method where a non-granulated zirconium-containing niobium powder is mixed with an appropriate binder such as camphor, polyacrylic acid, polymethyl acrylic acid ester or polyvinyl alcohol, and a solvent such as acetone, alcohols, acetic acid esters or water, and then cracked.

By using the granulated zirconium-containing niobium powder, the press-molding property at the production of a sintered body is improved.

The average particle size of the granulated powder is preferably from 20 to 500 μm. If the average particle size of the granulated powder is less than 20 μm, blocking partially takes place and bad fluidity into a metal mold results, whereas if it exceeds 500 μm, the molded article after the press-molding is readily broken at the corner parts. Furthermore, when the average particle size of the granulated powder is from 60 to 250 μm, a cathode agent can be easily impregnated into the sintered body at the manufacture of a capacitor after sintering the press-molded article.

The zirconium-containing niobium sintered body for capacitors of the present invention is produced by molding and sintering the above-described zirconium-containing niobium powder or granulated zirconium-containing niobium powder. The production method for the sintered body is not particularly limited, however, the sintered body may be obtained, for example, by press-molding the zirconium-containing niobium powder into a predetermined shape and then heating it at 500 to 2,000° C., preferably from 900 to 1,500° C., more preferably from 900 to 1,300° C., for several minutes to several hours under a pressure of $10^{-5}$ to $10^2$ Pa.

The manufacture of a capacitor device is described below.

The capacitor of the present invention is fabricated from the above-described sintered body as one part electrode, a dielectric material formed on the surface of the sintered body, and another part electrode provided on the dielectric material.

For example, a lead wire comprising a valve-acting metal such as niobium or tantalum and having an appropriate shape and an appropriate length is prepared and this lead wire is integrally molded at the sintering and press-molding of the niobium powder while inserting a part of the lead wire into the inside of the molded article, so that the lead wire can be designed to work out to a leading line of the sintered body.

The dielectric material used for the capacitor is a dielectric material composed of, for example, a tantalum oxide, a niobium oxide, a polymer substance or a ceramic compound, preferably a dielectric material mainly composed of a niobium oxide obtained by chemically forming the zirconium-containing niobium sintered body in an electrolytic solution. For chemically forming the zirconium-containing niobium electrode in an electrolytic solution, an aqueous protonic acid solution is generally used, such as aqueous 0.1% phosphoric acid solution, aqueous sulfuric acid solution, aqueous 1% acetic acid solution and aqueous adipic acid solution. In the case of chemically forming the zirconium-containing niobium electrode in an electrolytic solution to obtain a niobium oxide dielectric material, the capacitor of the present invention is an electrolytic capacitor and the zirconium-containing niobium electrode serves as anode.

In the capacitor of the present invention, the another part electrode is not particularly limited and for example, at least one material (compound) selected from electrolytic solutions, organic semiconductors and inorganic semiconductors known in the art of aluminum electrolytic capacitor may be used.

Specific examples of the electrolytic solution include a dimethylformamide-ethylene glycol mixed solution having dissolved therein 5% by mass of an isobutyltripropylammonium borotetrafluoride electrolyte, and a propylene carbonate-ethylene glycol mixed solution having dissolved therein 7% by mass of tetraethylammonium borotetrafluoride.

Specific examples of the organic semiconductor include an organic semiconductor comprising a benzopyrroline tetramer and chloranile, an organic semiconductor mainly comprising tetrathiotetracene, an organic semiconductor mainly comprising tetracyanoquinodimethane, and an organic semiconductor mainly comprising an electrically conducting polymer obtained by doping a dopant into a polymer comprising two or more repeating units represented by formula (1) or (2):

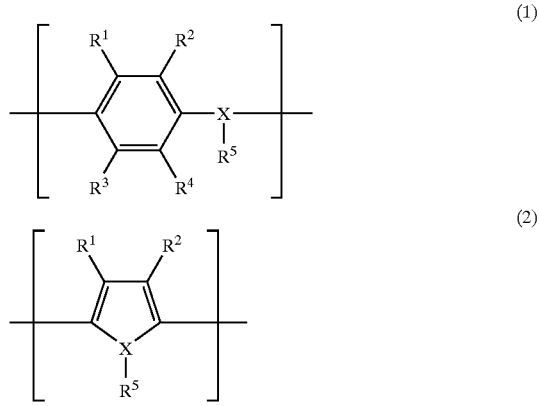

(wherein $R^1$ to $R^4$, which may be the same or different, each represents a hydrogen atom, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom and represents a hydrogen atom or an alkyl group having from 1 to 6 carbon atoms, and each of the pairs $R^1$ and $R^2$, and $R^3$ and $R^4$ may combine with each other to form a ring). For the dopant, any known dopant can be used without limit.

Examples of the polymer containing two or more repeating units represented by formula (1) or (2) include polyaniline, polyoxyphenylene, polyphenylene sulfide, polythiophene, polyfuran, polypyrrole, polymethylpyrrole, and substitution derivatives and copolymers thereof. Among these, preferred are polypyrrole, polythiophene and substitution derivatives thereof (e.g., poly(3,4-ethylene dioxothiophene)).

The term "mainly comprising an electrically conducting polymer" as used in the present specification means that even an electrically conducting polymer containing components derived from impurities in the starting material monomer of the organic semiconductor can be contained, that is, "an electrically conducting polymer is contained as a substantially effective component".

Examples of the dopant which can be used include sulfoquinone-base dopants, anthracene monosulfonic acid-base dopants and other various kind of anionic dopants. Also, an electron acceptor dopant such as $NO^+$ or $NO_2^+$ salt may be used.

Specific examples of the inorganic semiconductor include an inorganic semiconductor mainly comprising lead dioxide or manganese dioxide, and an inorganic semiconductor comprising triiron tetraoxide.

These semiconductors may be used individually or in combination of two or more thereof.

When the organic or inorganic semiconductor used has an electrical conductivity of $10^{-2}$ to $10^3$ S·cm$^{-1}$, the fabricated capacitor can have a smaller impedance value and can be more increased in the capacitance at a high frequency.

In the case where the another part electrode is solid, an electrically conducting layer may be provided thereon so as to attain good electrical contact with an exterior leader line (for example, lead frame).

The electrically conducting layer can be formed, for example, by the solidification of electrically conducting paste, the plating, the metallization or the formation of heat-resistant electrically conducting resin film. Preferred examples of the electrically conducting paste include silver paste, copper paste, aluminum paste, carbon paste and nickel paste, and these may be used individually or in combination of two or more thereof. In the case of using two or more kinds of pastes, these pastes may be mixed or may be superposed one on another as separate layers. The electrically conducting paste applied is then solidified by allowing it to stand in an air or under heating. Examples of the plating include nickel plating, copper plating, silver plating and aluminum plating. Examples of the metal to be vapor-deposited include aluminum, nickel, copper and silver.

More specifically, for example, carbon paste and silver paste are stacked in this order on the another part electrode and these are molded with a material such as epoxy resin, thereby fabricating a capacitor. This capacitor may have a niobium or tantalum lead which is sintered and molded integrally with the zirconium-containing niobium sintered body or welded afterward.

The thus-fabricated capacitor of the present invention is jacketed using, for example, resin mold, resin case, metallic jacket case, dipping of resin or laminate film, and then used as a capacitor product for various uses.

In the case where the another part electrode is liquid, the capacitor fabricated from the above-described two electrodes and the dielectric material is housed, for example, in a can electrically connected to the another part electrode to form a capacitor. In this case, the electrode side of the zirconium-containing niobium sintered body is guided outside through a niobium or tantalum lead described above and at the same time, insulated from the can using an insulating rubber or the like.

BEST MODE FOR CARRYING OUT THE INVENTION

The present invention is described in detail below by referring to the Examples and Comparative Examples, however, the present invention is not limited to these Examples. In each of the Examples and Comparative Examples, the capacitance and the leakage current value of the sintered body and the capacitance and the leakage current value of the capacitor processed into a chip, were measured and evaluated by the following methods.

(1) Measurement of Capacitance of Sintered Body

An LCR meter manufactured by Hewlett-Packard was connected between a sintered body dipped in 30% sulfuric acid and a tantalum material electrode placed in a sulfuric acid solution and the capacitance at 120 Hz was measured at room temperature and designated as the capacitance of the sintered body.

(2) Measurement of Leakage Current of Sintered Body

A d.c. voltage (14 V) corresponding to 70% of the chemical forming voltage at the time of forming a dielectric material was continuously applied between a sintered body dipped in an aqueous 20% phosphoric acid solution and an electrode placed in an aqueous phosphoric acid solution at room temperature for 3 minutes and thereafter, the current value was measured and designated as the leakage current value (LC value) of the sintered body.

(3) Measurement of Capacitance of Capacitor

The LCR meter manufactured by Hewlett-Packard was connected between terminals of a manufactured chip and the capacitance at 120 Hz was measured at room temperature and designated as the capacitance of the capacitor processed into a chip.

(4) Measurement of Leakage Current of Capacitor

Among rated voltages (e.g., 2.5 V, 4 V, 6.3 V, 10 V, 16 V, 25 V, etc.), a d.c. voltage (6.3 V) close to about 1/3 to about 1/4 of the chemical forming voltage at the time of forming a dielectric material was continuously applied between the terminals of a manufactured chip at room temperature for 1 minute and thereafter, the current value was measured and designated as the leakage current value of the capacitor processed into a chip.

EXAMPLE 1

Sintered Body of Zirconium-Containing Niobium Powder:

Using 92 g of a niobium ingot and 1 g of a zirconium powder, a zirconium-containing niobium ingot having a zirconium content of 1 mol% was produced by arc melting. In an SUS 304-made reactor, 50 g of the obtained ingot was placed and hydrogen was continuously introduced thereinto at 400° C. for 10 hours. After cooling, the hydrogenated zirconium-containing niobium lump was placed in an SUS 304-made pot containing SUS-made balls and pulverized for 10 hours. Thereafter, this hydride was formed into a 20 vol % slurry with water, charged together with zirconia balls into an SUS 304-made wet grinding machine, and wet pulverized for 7 hours. The resulting slurry was centrifuged and decanted to obtain a pulverized product. The pulverized product was dried in a vacuum under the conditions of 133 Pa (1 Torr) and 50° C. Subsequently, the hydrogenated zirconium-containing niobium powder was dehydrogenated by heating at 400° C. under $1.33\times10^{-2}$ Pa ($1\times10^{-4}$ Torr) for 1 hour. The produced zirconium-containing niobium powder had an average particle size of 1.0 µm and the zirconium content thereof was measured by the atomic absorption analysis and found to be 1 mol %. The thus-obtained zirconium-containing niobium powder was granulated in a vacuum of $4\times10^{-3}$ Pa ($3\times10^{-5}$ Torr) at 1,000° C. Thereafter, the granulated lump was cracked to obtain a granulated powder having an average particle size of 120 µm.

The obtained zirconium-containing niobium granulated powder was molded together with a 0.3-mmφ niobium wire to manufacture a molded article having a size of approximately 0.3×0.18×0.45 cm (about 0.1 g). This molded article was allowed to stand in a vacuum of $4\times10^{-3}$ Pa ($3\times10^{-5}$ Torr) at 1,200° C. for 30 minutes and thereby, a sintered body was obtained. The tensile strength of the niobium wire of this sintered body was measured and found to be 3 kg/cm² ($2.9\times10^5$ Pa), revealing that the sintered body had a sufficiently high strength. Subsequently, the sintered body obtained was electrochemically formed in an aqueous 0.1% phosphoric acid solution at a temperature of 80° C. for 200 minutes by applying a voltage of 20 V to form a dielectric layer on the surface. Thereafter, the capacitance in 30% sulfuric acid and the leakage current (hereinafter simply referred to as "LC") in an aqueous 20% phosphoric acid solution were measured. The results obtained are shown in Table 3.

EXAMPLES 2 TO 15

Sintered Body of Zirconium-Containing Niobium/Tantalum Powder:

Using a zirconium powder and a niobium, tantalum or niobium-tantalum alloy ingot at an arbitrary ratio, a zirconium-containing niobium ingot, a zirconium-containing tantalum ingot and a zirconium-containing niobium-tantalum ingot were manufactured by arc melting.

From 50 g of each ingot, a zirconium-containing niobium powder, a zirconium-containing tantalum powder and a zirconium-containing niobium-tantalum powder each having a desired particle size were obtained using the same apparatus as in Example 1 by adjusting the pulverization time. Using these powders, sintered bodies were manufactured in the same manner as in Example 1 and each was measured on the capacitance and the LC value. The results obtained are shown in Table 3.

COMPARATIVE EXAMPLES 1 TO 6

Niobium Powder, Tantalum Powder and Niobium-Tantalum Alloy Powder Each not Containing Zirconium:

By the same operation as in Example 1, a niobium powder, a tantalum powder and a niobium-tantalum alloy powder each containing no zirconium were prepared. Using these powders, sintered bodies were manufactured in the same manner as in Example 1 and each was measured on the capacitance and the LC. The results obtained are shown in Table 3.

COMPARATIVE EXAMPLES 7 AND 8

Niobium Powder Containing Excess Zirconium:

By the same operation as in Example 1, zirconium-containing niobium powders having a zirconium content of 18.7% by mol or 24.6% by mol were manufactured. Using these powders, sintered bodies were manufactured in the same manner as in Example 1 and each was measured on the capacitance and the LC. The results obtained are shown in Table 3.

TABLE 3

| | Composition (molar ratio) | | | Average Particle Size (μm) | Capacitance (μF · V/g) | LC (μA/g) |
|---|---|---|---|---|---|---|
| | Nb | Ta | Zr | | | |
| Example 1 | 99 | — | 1 | 1.0 | 139000 | 66 |
| Example 2 | 94 | 5 | 1 | 1.0 | 123000 | 51 |
| Example 3 | 90 | 9 | 1 | 1.0 | 119000 | 48 |
| Example 4 | — | 99 | 1 | 1.0 | 39000 | 6 |
| Example 5 | 99 | — | 1 | 0.5 | 285000 | 137 |
| Example 6 | 99 | — | 1 | 0.7 | 185000 | 92 |
| Example 7 | 99 | — | 1 | 1.3 | 117000 | 57 |
| Example 8 | 99 | — | 1 | 3.2 | 55000 | 20 |
| Example 9 | 99.98 | — | 0.02 | 1.0 | 106000 | 50 |
| Example 10 | 99.95 | — | 0.05 | 1.0 | 110000 | 53 |
| Example 11 | 99.5 | — | 0.5 | 1.0 | 132000 | 61 |
| Example 12 | 96.9 | — | 3.1 | 1.0 | 133000 | 64 |
| Example 13 | 93.8 | — | 6.2 | 1.0 | 126000 | 60 |
| Example 14 | 89.7 | — | 10.3 | 1.0 | 123000 | 63 |
| Example 15 | 86.3 | — | 14.7 | 1.0 | 109000 | 60 |
| Comparative Example 1 | 100 | — | — | 0.5 | 210000 | 2210 |
| Comparative Example 2 | 100 | — | — | 0.7 | 139000 | 1570 |
| Comparative Example 3 | 100 | — | — | 1.0 | 101000 | 592 |
| Comparative Example 4 | 100 | — | — | 1.3 | 85000 | 389 |
| Comparative Example 5 | 95 | 5 | — | 1.0 | 88000 | 321 |
| Comparative Example 6 | — | 100 | — | 1.0 | 31000 | 8 |
| Comparative Example 7 | 81.3 | — | 18.7 | 1.0 | 92000 | 69 |
| Comparative Example 8 | 75.4 | — | 24.6 | 1.0 | 84000 | 79 |

EXAMPLES 16 TO 21

Sintered Body of Zirconium-Containing Niobium Powder:

In an SUS 304-made reactor, 100 g of a niobium ingot was placed and hydrogen was continuously introduced thereinto at 400° C. for 10 hours. After cooling, the hydrogenated niobium lump was placed in an SUS 304-made pot containing SUS-made balls and pulverized for 10 hours. Thereafter, this hydride was formed into a 20 vol % slurry with water, charged together with zirconia balls into an SUS 304-made wet grinding machine ("Attritor", trade name), and wet pulverized for 7 hours. The resulting slurry was centrifuged and decanted to obtain a pulverized product. The pulverized product was dried in a vacuum under the conditions of 133 Pa (1 Torr) and 50° C. Subsequently, the hydrogenated niobium powder was dehydrogenated by heating at 400° C. under $1.33 \times 10^{-2}$ Pa ($1 \times 10^{-4}$ Torr) for 1 hour. The manufactured niobium powder had an average particle size of 1.3 μm.

This niobium powder was mixed with any one of zirconium oxide, zirconium hydride and zirconium metal each having an average particle size of about 1 μm, at an arbitrary ratio. The obtained zirconium-containing niobium powders each was granulated in a vacuum of $4 \times 10^{-3}$ Pa ($3 \times 10^{-5}$ Torr) at 1,000° C. Thereafter, the granulated lump was cracked to obtain granulated powders having an average particle size of 190 μm.

The thus-obtained zirconium-containing niobium granulated powders each was molded together with a 0.3-mmφ niobium wire to manufacture a molded article having a size of approximately 0.3×0.18×0.45 cm (about 0.1 g). Subsequently, the molded articles each was allowed to stand in a vacuum of $4 \times 10^{-3}$ Pa ($3 \times 10^{-5}$ Torr) at 1,230° C. for 30 minutes to obtain sintered bodies. The obtained sintered bodies each was electrochemically formed in an aqueous 0.1% phosphoric acid solution at a temperature of 80° C. for 200 minutes by applying a voltage of 20 V to form a dielectric layer on the surface. Thereafter, the capacitance in 30% sulfuric acid and the LC in an aqueous 20% phosphoric acid solution were measured. The results obtained are shown in Table 4.

TABLE 4

| | Species of Zirconium | Zirconium Content (mol %) | Capacitance (μF · V/g) | LC (μA/g) |
|---|---|---|---|---|
| Example 16 | zirconium oxide | 0.2 | 102000 | 39 |
| Example 17 | zirconium oxide | 1.0 | 116000 | 55 |
| Example 18 | zirconium hydride | 0.5 | 104000 | 43 |
| Example 19 | zirconium hydride | 2.2 | 115000 | 53 |
| Example 20 | metal zirconium | 0.05 | 93000 | 40 |
| Example 21 | metal zirconium | 0.7 | 112000 | 51 |

EXAMPLES 22 TO 26

Sintered Body of Zirconium-Containing Partially Nitrided Niobium Powder:

Into an SUS 304-made reactor, 10 g of a zirconium-containing niobium powder containing 1.2 mol % of zirconium and having an average particle size of 0.9 μm, which was manufactured in the same manner as in Example 1, was charged. Thereinto, nitrogen was continuously introduced at 300° C. for 0.5 to 20 hours to obtain zirconium-containing niobium nitrides.

The nitrogen amount of each nitride was determined using a nitrogen amount measuring apparatus manufactured by LECO, which determines the nitrogen amount from the thermal conductivity. The ratio of the measured value to the separately measured mass of the powder was designated as the nitrided amount. The nitrided amount here was from 0.02 to 0.89% by mass. The obtained zirconium-containing niobium nitrides each was granulated, molded and sintered in the same manner as in Example 1 and each sintered body obtained was electrochemically formed in an aqueous 0.1% phosphoric acid solution at a temperature of 80° C. for 200 minutes by applying a voltage of 20 V to form a dielectric layer on the surface. Thereafter, the capacitance in 30% sulfuric acid and the LC value in an aqueous 20% phosphoric acid solution were measured. The results obtained are shown in Table 5.

TABLE 5

|  | Zirconium Content (mol %) | Nitrogen Content (mass %) | Capacitance ($\mu F \cdot V/g$) | LC ($\mu A/g$) |
| --- | --- | --- | --- | --- |
| Example 22 | 1.2 | 0.02 | 142000 | 65 |
| Example 23 | 1.2 | 0.10 | 141000 | 58 |
| Example 24 | 1.2 | 0.28 | 143000 | 55 |
| Example 25 | 1.2 | 0.43 | 141000 | 55 |
| Example 26 | 1.2 | 0.89 | 139000 | 70 |

EXAMPLES 27 TO 29
Sintered Body of Zirconium-Containing Niobium Powder/Niobium Powder Mixture:

Into a nickel-made crucible, 20 g of potassium fluoroniobate thoroughly dried in a vacuum at 80° C. and sodium in a molar amount of 10 times the potassium fluoroniobate were charged and allowed to perform a reduction reaction at 1,000° C. for 20 hours in an argon atmosphere. After the completion of reaction, the system was cooled and the reduction product was sequentially washed with water, with 95% sulfuric acid and then with water, dried in a vacuum and pulverized for 40 hours using a ball mill of an alumina pot containing silica alumina balls. The pulverized product was dipped and stirred in a 3:2 (by mass) mixed solution of 50% nitric acid and 10% aqueous hydrogen peroxide. Thereafter, the pulverized product was thoroughly washed with water until the pH reached 7 to remove impurities, and dried in a vacuum. The produced niobium powder had an average particle size of 1.2 $\mu$m.

The thus-obtained niobium powder was thoroughly mixed with a zirconium-containing niobium powder containing 10% by mol of zirconium and having an average particle size of 1.0 $\mu$m prepared in the same manner as in Example 14, at an arbitrary ratio and the resulting mixtures each was granulated, molded and sintered in the same manner as in Example 14 to obtain sintered bodies. The capacitance and the LC value of each sintered body were measured and the results obtained are shown in Table 6.

EXAMPLES 30 TO 32
Sintered Body of Partially Nitrided Zirconium-Containing Niobium Powder/Niobium Powder Mixture In an SUS 304-made reactor, 50 g of a niobium ingot was placed and hydrogen was continuously introduced thereinto at 400° C. for 12 hours. After cooling, the hydrogenated niobium lump was placed in an SUS 304-made pot containing iron-made balls and pulverized for 10 hours. This pulverized product was charged into the same SUS 304-made reactor as above and again hydrogenated under the above-described conditions. Thereafter, this hydride was formed into a 20 vol % slurry with water, charged together with zirconia balls into an SUS 304-made wet grinding machine, and wet-pulverized for 6 hours. The resulting slurry was centrifuged and decanted to obtain a pulverized product. The pulverized product was dried in a vacuum under the conditions of 1.33×10$^2$ Pa (1 Torr) and 50° C. Subsequently, the hydrogenated niobium powder was dehydrogenated by heating at 400° C. under 1.33×10$^{-2}$ Pa (10$^{-4}$ Torr) for 1 hour. The manufactured niobium powder had an average particle size of 1.0 $\mu$m.

The thus-obtained niobium powder was thoroughly mixed with a zirconium-containing niobium powder containing 10% by mol of zirconium and having an average particle size of 0.9 $\mu$m prepared in the same manner as in Example 14, at an arbitrary ratio and after obtaining a nitride from each mixture in the same manner as in Example 24, the nitrides each was granulated, molded and sintered to obtain sintered bodies. The capacitance and the LC value of each sintered body were measured and the results obtained are shown in Table 6.

TABLE 6

|  | Species of Niobium Powder | Mixing Ratio (zirconium-containing niobium powder: niobium powder) | Capacitance ($\mu F \cdot V/g$) | LC ($\mu A/g$) |
| --- | --- | --- | --- | --- |
| Example 27 | reduced powder | 90:10 | 122000 | 65 |
| Example 28 | reduced powder | 50:50 | 128000 | 61 |
| Example 29 | reduced powder | 10:90 | 137000 | 63 |
| Example 30 | pulverized powder | 80:20 | 124000 | 59 |
| Example 31 | pulverized powder | 40:60 | 130000 | 60 |
| Example 32 | pulverized powder | 20:80 | 137000 | 60 |

EXAMPLES 33 TO 34
Manufacture and Evaluation of Capacitor Device According to the Present Invention 50 Units of each sintered body were prepared in Example 33 in the same manner as in Example 1 and in Example 34 in the same manner as in Example 11, respectively.

These sintered bodies each was electrochemically formed using an aqueous 0.1% phosphoric acid solution at a voltage of 20 V for 200 minutes to form an oxide dielectric film on the surface. Subsequently, an operation of dipping each sintered body in an aqueous 60% manganese nitrate solution and then heating it at 220° C. for 30 minutes was repeated to form a manganese dioxide layer as the another part electrode layer on the oxide dielectric film. On this another part electrode layer, a carbon layer and a silver paste layer were stacked in this order. After mounting a lead frame thereon, the device as a whole was molded with an epoxy resin to manufacture a chip-type capacitor. The average capacitance and the average LC value of the chip-type capacitors (n=50 units in each Example) are shown in Table 7.

COMPARATIVE EXAMPLES 8 TO 10
Capacitor Device Using Sintered Body of Niobium Powder Not Containing Zirconium Into a nickel-made crucible, 20 g of potassium fluoroniobate thoroughly dried in a vacuum at 80° C. and sodium in a molar amount of 10 times the potassium fluoroniobate were charged and allowed to perform a reduction reaction at 1,000° C. for 20 hours in an argon atmosphere. After the completion of reaction, the system was cooled and the reduction product was sequentially washed with water, with 95% sulfuric acid and then with water, dried in a vacuum and pulverized for 40 hours using a ball mill of an alumina pot containing silica alumina balls. The pulverized product was dipped and stirred in a 3:2 (by mass) mixed solution of 50% nitric acid and 10% aqueous hydrogen peroxide. Thereafter, the pulverized product was thoroughly washed with water until the pH reached 7 to remove impurities, and dried in a vacuum. The manufactured niobium powder had an average particle size of 1.3 μm.

Into an SUS 304-made reactor, 30 g of the thus-obtained niobium powder was charged and thereinto, nitrogen was continuously introduced at 300° C. for 0.5 to 4 hours to obtain niobium nitrides. The nitrogen amount of each nitride was determined using the nitrogen amount measuring apparatus manufactured by LECO, which determines the nitrogen amount from the thermal conductivity. The ratio of the measured value to the separately measured mass of the powder was designated as the nitrided amount, as a result, the nitrided amount here was from 0.02 to 0.30% by mass.

Each niobium nitride was granulated, molded and sintered in the same manner as in Example 1 to obtain a sintered body.

Using the sintered bodies obtained, 50 units of chip-type capacitors were manufactured in the same manner as in Examples 33 to 34 and the physical properties of each chip-type capacitor manufactured were measured. The results obtained are shown in Table 7.

TABLE 7

|  | Nitrogen Content (mass %) | Capacitance (μF) | LC (μA) | Number of Units Having LC Exceeding 100 μA |
| --- | --- | --- | --- | --- |
| Example 33 | — | 625 | 46 | 0/50 |
| Example 34 | — | 594 | 42 | 0/50 |
| Comparative Example 8 | 0.02 | 398 | 46 | 1/50 |
| Comparative | 0.07 | 392 | 42 | 1/50 |

TABLE 7-continued

|  | Nitrogen Content (mass %) | Capacitance (μF) | LC (μA) | Number of Units Having LC Exceeding 100 μA |
| --- | --- | --- | --- | --- |
| Example 9 Comparative Example 10 | 0.30 | 382 | 30 | 0/50 |

EXAMPLES 35 TO 37
Manufacture and Evaluation of Capacitor Device According to the Present Invention 50 Units of each sintered body were prepared in Example 35 in the same manner as in Example 7, in Example 36 in the same manner as in Example 12 and in Example 37 in the same manner as in Example 24. These sintered bodies each was electrochemically formed using an aqueous 0.1% phosphoric acid solution at a voltage of 20 V for 200 minutes to form an oxide dielectric film on the surface.

Thereafter, an operation of contacting the oxide dielectric film with an equivalent mixed solution of an aqueous 10% ammonium persulfate solution and an aqueous 0.5% anthraquinone sulfonic acid solution and then with pyrrole vapor was repeated at least 5 times, whereby another part electrode comprising polypyrrole was formed on the oxide dielectric film. On this another part electrode, a carbon layer and a silver paste layer were stacked in this order. After mounting a lead frame thereon, the device as a whole was molded with an epoxy resin to manufacture a chip-type capacitor. The average capacitance and the average LC value of the chip-type capacitors (n=50 units in each Example) are shown in Table 8.

COMPARATIVE EXAMPLES 11 TO 13
Capacitor Device Using Sintered Body of Niobium Powder Not Containing Zirconium In an SUS 304-made reactor, 50 g of a niobium ingot was placed and thereinto, hydrogen was continuously introduced at 400° C. for 12 hours. After cooling, the hydrogenated niobium lump was placed in an SUS 304-made pot containing iron-made balls and pulverized for 10 hours. This pulverized product was charged into the same SUS 304-made reactor as above and again hydrogenated under the above-described conditions. Thereafter, this hydride was formed into a 20 vol % slurry with water, charged together with zirconia balls into an SUS 304-made wet grinding machine, and wet pulverized for 6 hours. The resulting slurry was centrifuged and decanted to obtain a pulverized product. The pulverized product was dried in a vacuum of $1.33 \times 10^2$ Pa (1 Torr) at 50° C. Subsequently, the hydrogenated niobium powder was dehydrogenated by heating at 400° C. under $1.33 \times 10^{-2}$ Pa ($1 \times 10^{-4}$ Torr) for 1 hour. The manufactured niobium powder had an average particle size of 1.0 μm.

Into an SUS 304-made reactor, 30 g of the obtained niobium powder was charged and thereinto, nitrogen was continuously introduced at 300° C. for 0.5 to 3 hours to obtain niobium nitrides. The nitrogen amount of each nitride was determined using a nitrogen amount measuring apparatus manufactured by LECO, which determines the nitrogen amount from the thermal conductivity. The ratio of the measured value to the separately measured mass of the powder was designated as the nitrided amount, as a result, the nitrided amount here was from 0.03 to 0.28% by mass.

Each niobium nitride was granulated, molded and sintered in the same manner as in Example 1 to obtain a sintered body.

Using the sintered body obtained, 50 units of chip-type capacitors were manufactured in the same manner as in Examples 35 to 37 and the physical properties of each chip-type capacitor obtained were measured. The results obtained are shown in Table 8 below.

TABLE 8

|  | Nitrogen Content (mass %) | Capacitance ($\mu$F) | LC ($\mu$A) | Number of Units Having LC Exceeding 100 $\mu$A |
|---|---|---|---|---|
| Example 35 | — | 528 | 46 | 0/50 |
| Example 36 | — | 595 | 45 | 0/50 |
| Example 37 | 0.29 | 642 | 43 | 0/50 |
| Comparative Example 11 | 0.02 | 453 | 48 | 1/50 |
| Comparative Example 12 | 0.14 | 444 | 44 | 0/50 |
| Comparative Example 13 | 0.28 | 451 | 40 | 0/50 |

EXAMPLES 38 TO 39

Manufacture and Evaluation of Capacitor Device According to the Present Invention 50 Units of each sintered body were prepared in Example 38 in the same manner as in Example 8 and in Example 39 in the same manner as in Example 15. These sintered bodies each was electrochemically formed using an aqueous 0.1% phosphoric acid solution at a voltage of 20 V for 200 minutes to form an oxide dielectric film on the surface. Subsequently, an operation of dipping each sintered body in a mixed solution of an aqueous 35% lead acetate solution and an aqueous 35% ammonium persulfate solution (1:1 by volume) and allowing the reaction to proceed at 40° C. for 1 hour was repeated to form a mixed layer of lead dioxide and lead sulfate as the another part electrode layer on the oxide dielectric film. On this another part electrode layer, a carbon layer and a silver paste layer were stacked in this order. After mounting a lead frame thereon, the device as a whole was molded with an epoxy resin to manufacture a chip-type capacitor. The average capacitance and the average LC value of the chip-type capacitors (n=50 units in each Example) are shown in Table 9 below.

TABLE 9

|  | Nitrogen Content (mass %) | Capacitance ($\mu$F) | LC ($\mu$A) | Number of Units Having LC Exceeding 100 $\mu$A |
|---|---|---|---|---|
| Example 38 | — | 247 | 14 | 0/50 |
| Example 39 | — | 491 | 45 | 0/50 |

INDUSTRIAL APPLICABILITY

The capacitor manufactured from a sintered body of the powder for capacitors according to the present invention, which contains a specific amount of zirconium and mainly comprises niobium and/or tantalum, is favored with a large capacitance, good leakage current (LC) characteristics, less dispersion and high reliability.

What is claimed is:

1. A powder for capacitors, which contains from 0.01 to 15 atom % of zirconium and mainly comprises niobium and/or tantalum and wherein a specific surface area is from 0.5 to 15 m$^2$/g.

2. The powder for capacitors as claimed in claim 1, which contains from 0.05 to 3 atom % of zirconium and mainly comprises niobium and/or tantalum.

3. The powder for capacitors as claimed in claim 1, which mainly comprises niobium.

4. The powder for capacitors as claimed in claim 1, which mainly comprises tantalum.

5. The powder for capacitors as claimed in claim 1, which mainly comprises a niobium-tantalum alloy.

6. The powder for capacitors as claimed in claim 1, wherein the average particle size is from 0.2 to 5 $\mu$m.

7. The powder for capacitors as claimed in claim 1, wherein a part of niobium and/or tantalum is combined with at least one element selected from nitrogen, carbon, boron or sulfur.

8. The powder for capacitors as claimed in claim 7, wherein the amount of the combined element above is 50–200,000 ppm.

9. A powder for capacitors, having an average particle size of from 20 to 500 $\mu$m and containing from 0.01 to 15 atom % of zirconium and mainly comprises niobium and/or tantalum, which is obtained by granulating the powder for capacitors claimed in claim 1.

10. A sintered body using the powder for capacitors claimed in claim 1.

11. The sintered body as claimed in claim 10, wherein the specific surface area is from 0.5 to 5 m$^2$/g.

12. A capacitor fabricated from the sintered body claimed in claim in 10 as one part electrode, a dielectric material formed on the surface of the sintered body, and another part electrode provided on the dielectric material.

13. The capacitor as claimed in claim 12, wherein the dielectric material contains a niobium oxide and/or a tantalum oxide.

14. The capacitor as claimed in claim 13, wherein the niobium oxide and/or tantalum oxide is formed by electrolytic oxidation.

15. The capacitor as claimed in claim 12, wherein the another part electrode is at least one material selected from an electrolytic solution, an organic semiconductor or an inorganic semiconductor.

16. The capacitor as claimed in claim 15, wherein the another part electrode is formed of an organic semiconductor and the organic semiconductor is at least one organic semiconductor selected from the group consisting of an organic semiconductor comprising a benzopyrroline tetramer and chloranile, an organic semiconductor mainly comprising tetrathiotetracene, an organic semiconductor mainly comprising tetracyanoquinodimethane, and an organic semiconductor mainly comprising an electrically conducting polymer obtained by doping a dopant into a polymer comprising two or more repeating units represented by the following formula (1) or (2):

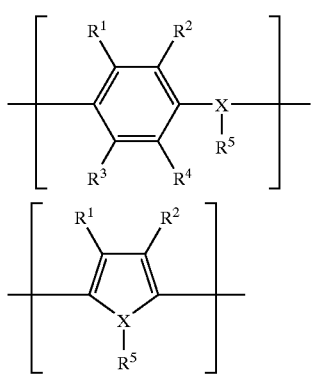

(wherein $R^1$ to $R^4$, which may be the same or different, each represents a hydrogen atom, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom and represents a hydrogen atom or an alkyl group having from 1 to 6 carbon atoms, and each of the pairs $R^1$ and $R^2$, and $R^3$ and $R^4$ may combine with each other to form a ring).

17. The capacitor as claimed in claim 16, wherein the organic semiconductor is at least one member selected from polypyrrole, polythiophene and substitution derivatives thereof.

18. A powder for capacitors, which contains from 0.05 to 3 atom % of zirconium and mainly comprises niobium and/or tantalum.

19. The powder for capacitors as claimed in claim 1, which contains from 0.02 to 1 atom % of zirconium and mainly comprises niobium and/or tantalum.

20. A sintered body prepared by sintering a molded powder as claimed in claim 18, wherein said sintered body, after being subjected to electrochemical forming to form a dielectric layer on the surface of the sintered body, has a CV value of 110,000 $\mu$F·V/g or more.

21. A granulated powder prepared by granulating the powder for capacitors as claimed in claim 18, said granulated powder having an average particle size of from 60 to 250 $\mu$m.

* * * * *